US012626133B2

(12) United States Patent (10) Patent No.: US 12,626,133 B2

Shen (45) Date of Patent: May 12, 2026

(54) STRUCTURAL OBFUSCATION FOR PROTECTING DEEP LEARNING MODELS ON EDGE DEVICES

(71) Applicant: MediaTek Inc., Hsinchu City (TW)

(72) Inventor: Bor-Yeh Shen, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 701 days.

(21) Appl. No.: 18/086,781

(22) Filed: Dec. 22, 2022

(65) Prior Publication Data

US 2023/0214658 A1 Jul. 6, 2023

Related U.S. Application Data

(60) Provisional application No. 63/296,899, filed on Jan. 6, 2022.

(51) Int. Cl.
*G06N 3/082* (2023.01)
*G06F 9/54* (2006.01)

(52) U.S. Cl.
CPC .............. *G06N 3/082* (2013.01); *G06F 9/54* (2013.01)

(58) Field of Classification Search
CPC .. G06N 3/082; G06N 3/10; G06F 9/54; G06F 21/14

See application file for complete search history.

(56) References Cited

U.S. PATENT DOCUMENTS

| | | | | |
|---|---|---|---|---|
| 10,289,816 B1 * | 5/2019 | Malassenet | ......... | G06F 9/45516 |
| 2018/0285567 A1 * | 10/2018 | Raman | .................. | G06F 21/566 |
| 2019/0095629 A1 * | 3/2019 | Lee | .......................... | G06N 3/08 |
| 2021/0133577 A1 * | 5/2021 | Srinivasan | ............. | G06N 3/045 |
| 2021/0350264 A1 | 11/2021 | Cheng | | |
| 2023/0196155 A1 * | 6/2023 | Maslov | ................... | G06F 21/14 706/62 |
| 2023/0401422 A1 * | 12/2023 | Li | .......................... | G06F 21/14 |
| 2024/0330659 A1 * | 10/2024 | Eisen | ..................... | G06F 21/14 |

OTHER PUBLICATIONS

Abhishek Chakraborty et al., Hardware-Assisted Intellectual Property Protection of Deep Learning Models, DAC '20: Proceedings of the 57th ACM/EDAC/IEEE Design Automation Conference, Jul. 2020.

Hui Xu et al., DeepObfuscation: Securing the Structure of Convolutional Neural Networks via Knowledge Distillation, arXiv:1806. 10313v1, Jun. 27, 2018.

J. Li, Z. He, A. S. Rakin, D. Fan and C. Chakrabarti, "NeurObfuscator: A Full-stack Obfuscation Tool to Mitigate Neural Architecture Stealing," 2021 IEEE International Symposium on Hardware Oriented Security and Trust (HOST), Tysons Corner, VA, USA, 2021, pp. 248-258, doi: 10.1109/HOST49136.2021.9702279.

Extended European Search Report, App. No. EP 23150397.0, Dated May 18, 2023.

* cited by examiner

*Primary Examiner* — Ryan Barrett

(74) *Attorney, Agent, or Firm* — Tong J. Lee

(57) ABSTRACT

A method for obfuscating deep learning (DL) models includes the step of training a DL model to obtain weights of operation (OP) layers in the trained DL model. The DL model includes an interface to a public application programming interface (API) that provides access to a compiler of an artificial intelligence (AI) processor. The method further includes the steps of obfuscating the DL model by changing a structure of the OP layers to produce an obfuscated DL model, and publishing the obfuscated DL model for access by devices. The obfuscated DL model is executable by the AI processor after compilation by the compiler on an edge device.

20 Claims, 8 Drawing Sheets

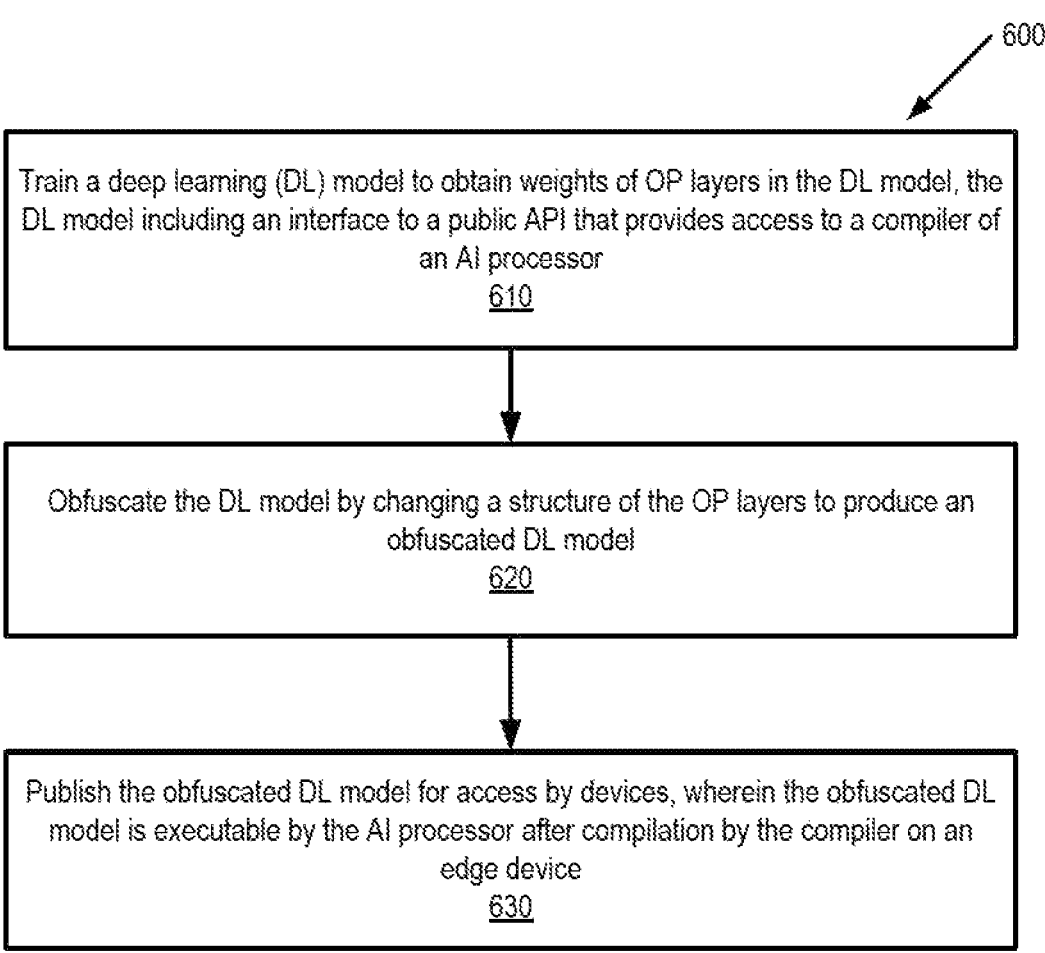

600

Train a deep learning (DL) model to obtain weights of OP layers in the DL model, the DL model including an interface to a public API that provides access to a compiler of an AI processor
610

Obfuscate the DL model by changing a structure of the OP layers to produce an obfuscated DL model
620

Publish the obfuscated DL model for access by devices, wherein the obfuscated DL model is executable by the AI processor after compilation by the compiler on an edge device
630

FIG. 6

STRUCTURAL OBFUSCATION FOR PROTECTING DEEP LEARNING MODELS ON EDGE DEVICES

CROSS-REFERENCE TO RELATED APPLICATIONS

This application claims the benefit of U.S. Provisional Application No. 63/296,899 filed on Jan. 6, 2022, the entirety of which is incorporated by reference herein.

TECHNICAL FIELD

Embodiments of the invention relate to the use of obfuscation to protect deep learning models.

BACKGROUND

Designing and training a well-performing deep learning (DL) model is generally expensive and time-consuming. Malicious users can easily acquire DL models on edge devices, especially on mobile phones, if the models use public formats or public application programming interfaces (APIs).

Typically, the manufacturer of an artificial intelligence (AI) processor provides a software development kit (SDK) to the developers of AI applications that include DL models. The developers use the SDK to convert the AI applications to a proprietary format or native machine instructions, which are non-portable to different AI processors. The developers may want the AI applications to run on different AI processors while protecting the intellectual property in the DL models.

Thus, there is a need for protecting trained DL models against piracy on edge devices without sacrificing the accuracy of the DL models.

SUMMARY

In one embodiment, a method is provided for obfuscating deep learning (DL) models. The method comprises training a DL model to obtain weights of operation (OP) layers in the trained DL model. The DL model includes an interface to a public application programming interface (API) that provides access to a compiler of an artificial intelligence (AI) processor. The method further comprises obfuscating the DL model by changing a structure of the OP layers to produce an obfuscated DL model, and publishing the obfuscated DL model for access by devices. The obfuscated DL model is executable by the AI processor after compilation by the compiler on an edge device.

In another embodiment, a system is provided to obfuscate DL models. The system comprises processing hardware; and memory to store an obfuscator and a DL model that includes OP layers. The processing hardware is operative to train the DL model to obtain weights of the OP layers. The DL model includes an interface to a public API that provides access to a compiler of an AI processor. The processing hardware is further operative to obfuscate the DL model using the obfuscator by changing a structure of the OP layers to produce an obfuscated DL model, and publish the obfuscated DL model for access by devices. The obfuscated DL model is executable by the AI processor after compilation by the compiler on an edge device.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 6 is a flow diagram illustrating a method for performing DL model obfuscation according to one embodiment.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention protect deep learning (DL) models executed on edge devices by obfuscation. A manufacturer of an AI accelerator may provide an obfuscator to developers of DL models that run on the AI accelerator of an edge device. The obfuscator can obfuscate a DL model to hide and protect proprietary information in the DL model. The obfuscation makes it more difficult to understand, modify, and reverse-engineer the DL model. The obfuscated DL model includes an interface to a public application programming interface (API), also known as an open API, which is based on an open standard and available for use by the public. An edge device may provide a compiler for the AI accelerator, which can be accessed by the obfuscated DL model through the public API. The compiler compiles the obfuscated DL model into a compiled DL model to run on the AI accelerator. In one embodiment, the compiler can optimize the obfuscated DL model, as the compiler and the obfuscator may both be provided by the manufacturer of the AI accelerator.

The term "DL model" as used herein refers to a neural network (NN) model of multiple operation (OP) layers. The terms "DL model" and "NN model" may be used interchangeably. Furthermore, the terms "AI accelerator" and "AI processor" may be used interchangeably. Non-limiting of a public API include TensorFlow™ Lite, Android™ Neural Network API, Web Neural Network API, etc.

The obfuscated DL model and the original DL model (i.e., the DL model before obfuscation) may produce the same or substantially the same inference results. In some embodiments, the inference results from these two DL models can be not exactly the same, as long as the accuracy of the obfuscated DL model is within a predetermined tolerance (i.e., both models have substantially the same accuracy). Thus, aggressive obfuscations may be performed on a DL model, such as execution sequence reordering for floating point operations. A number of obfuscation examples will be described below.

Figure 1:
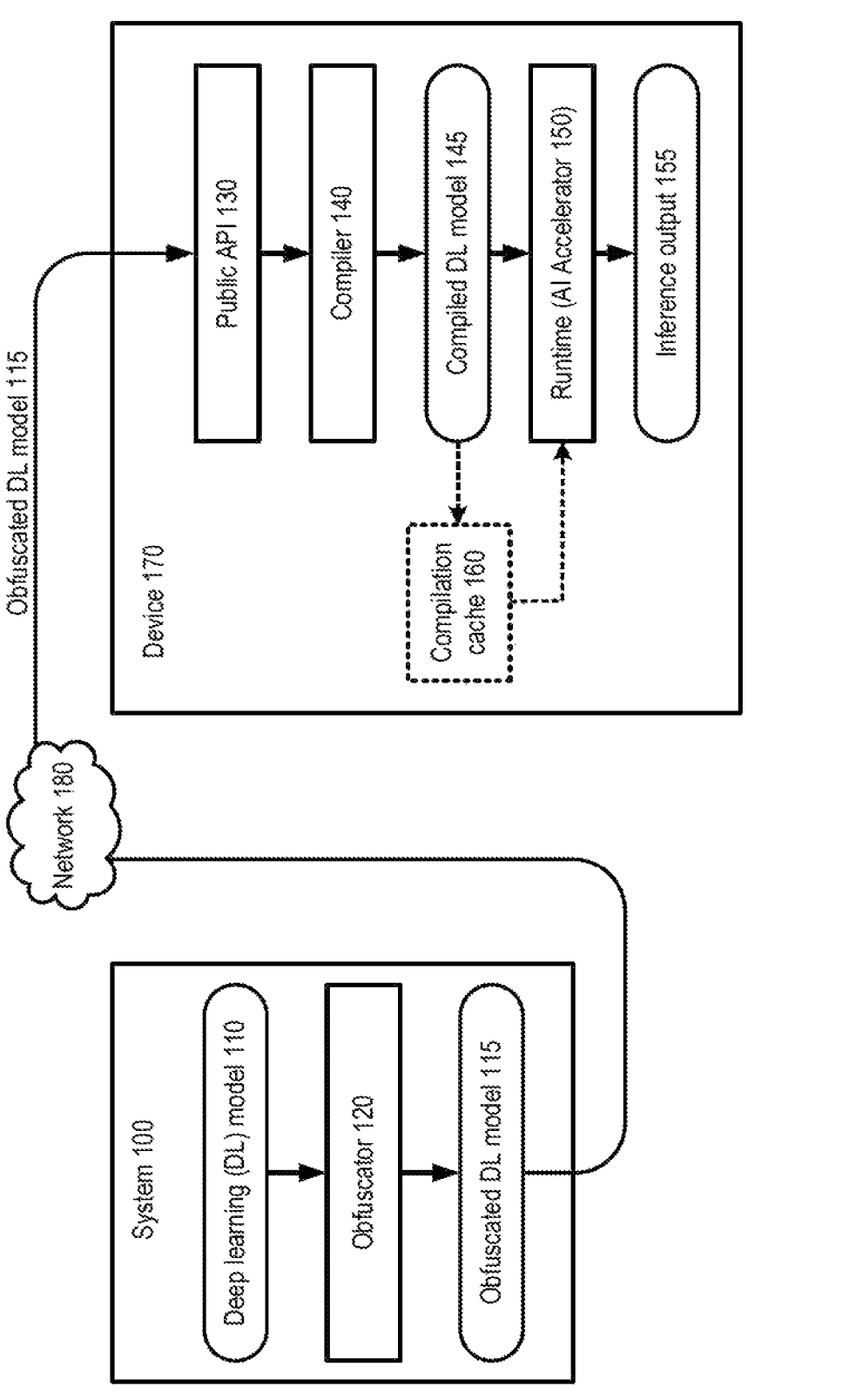
FIG. 1 is a block diagram illustrating an environment in which DL model obfuscation may be practiced according to one embodiment.

FIG. 1 is a block diagram illustrating an environment in which DL model obfuscation may be practiced according to one embodiment. In FIG. 1, blocks with rounded corners indicate input/output. A system 100 uses an obfuscator 120 to perform obfuscation on a DL model 110. The obfuscator 120 receives the DL model 110 as input and generates an obfuscated DL model 115 as output. The DL model 110 is a trained neural network with multiple operation (OP) layers. The obfuscator 120 may change, among others, the structure (e.g., OP layers), the weights, and/or the execution order of the DL model 110. The obfuscated DL model 115 does not need to be retrained. The DL model 110 and the obfuscated DL model 115 are described in the same model language. Non-limiting examples of a model language include TensorFlow Lite, Open Neural Network Exchange (ONNX™), Neural Network Exchange Format (NNEF), etc.

The obfuscator 120 may be implemented in hardware, in software executed on the hardware, or a combination of hardware and software. The obfuscated DL model 115 may be downloaded to a device 170; e.g., an edge device, to be compiled and executed.

In one embodiment, system 100 may publish the obfuscated DL model 115 to make it accessible over a network 180 such as the Internet. For example, system 100 may publish a software application (e.g., an app) containing the code of the obfuscated DL model 115. A user of device 170 may download the app from an online marketplace of apps. On device 170, the obfuscated DL model 115 runs on top of a public API 130, which provides an interface to a compiler 140. The compiler 140 compiles the obfuscated DL model 115 into a compiled DL model 145 executable by an AI accelerator 150. At runtime, the AI accelerator 150 executes the compiled DL model 145 to generate an inference output 155. In one embodiment, the compiler 140 may optimize the obfuscated DL model 115 during compile time. In another embodiment, the optimization of the obfuscated DL model may take place at a different time, such as runtime.

In one embodiment, the compiler 140 may generate the compiled DL model 145 every time the DL model is executed. In an alternative embodiment, the compiler 140 may compile the obfuscated DL model 115 once and store the compiled DL model 145 in a compilation cache 160 (as shown by the dotted block). Thus, the compiler 140 does not need to re-compile the same obfuscated DL model 115 every time it is executed. The compiled DL model 145 in the compilation cache 160 may be in a proprietary format or machine instructions executable by the AI accelerator 150.

In one embodiment, both the obfuscator 120 and the compiler 140 may be provided by the manufacturer of the AI accelerator 150. Thus, proprietary information regarding the obfuscation may be made available to programmers of the compiler 140, such that the compiler 140 can more effectively optimize the obfuscated DL model 115 during the compilation process. The optimization may restore at least a portion of the obfuscated structure and/or weights of the DL model 110.

In one embodiment, the obfuscated DL model 115 may be compiled and executed without optimization. Even without the optimization, the obfuscated DL model 115 and the DL model 110 after compilation when executed by the AI accelerator 150 may generate the same or substantially the same inference results with substantially the same accuracy.

Figure 2:
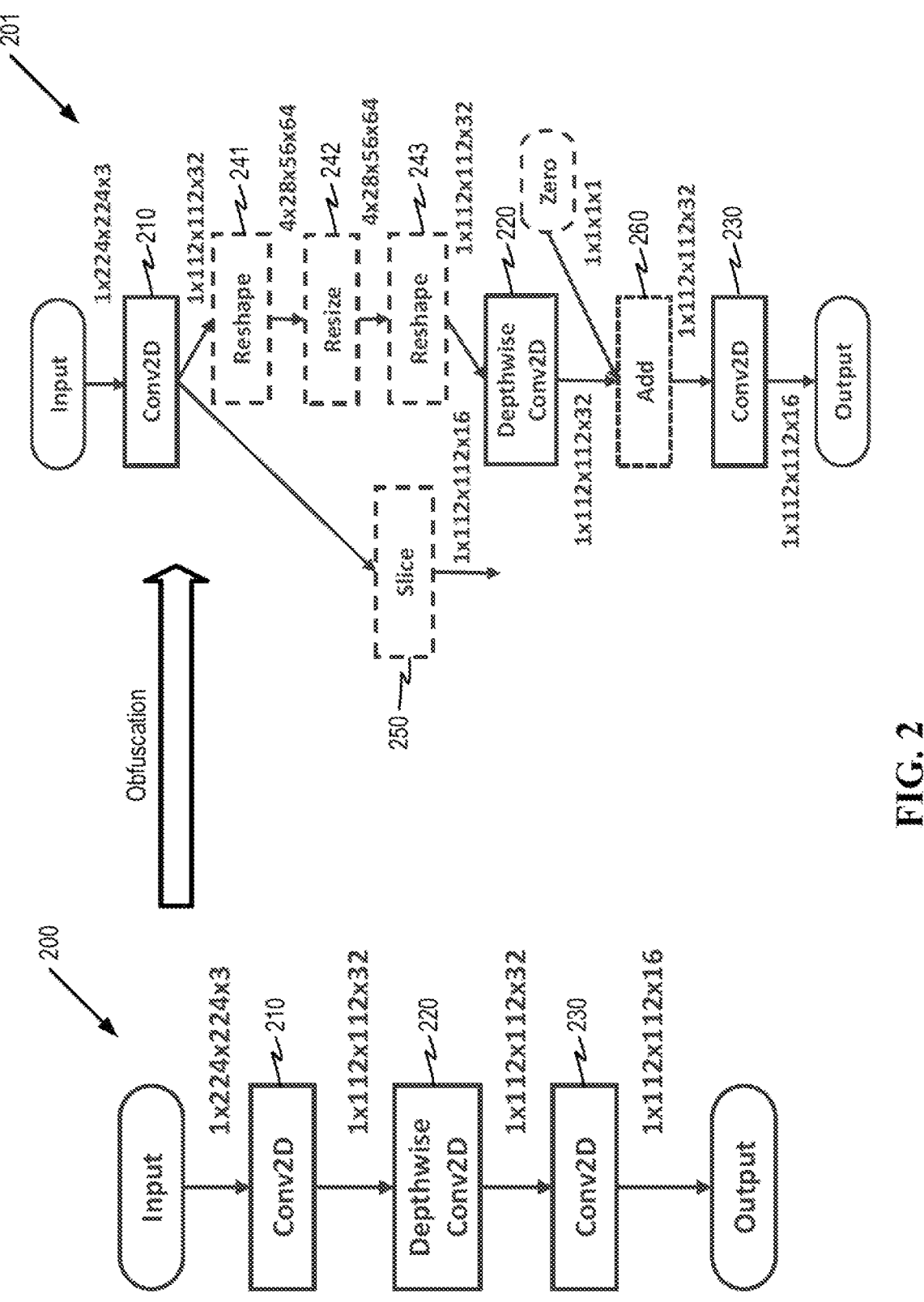
FIG. 2 illustrates an example of adding redundant operation (OP) layers according to one embodiment.

FIG. 2-FIG. 5 provide a number of obfuscation examples performed by the obfuscator 120. FIG. 2 illustrates an example of adding redundant OP layers according to one embodiment. A DL model 200 before obfuscation is shown on the left. The DL model 200 includes a first two-dimensional (2D) convolution layer (Conv2D 210), a depth-wise 2D convolution layer (depthwise Conv2D 220), followed by a second 2D convolution layer (Conv2D 230). In this example, the obfuscator 120 (FIG. 1) obfuscates the DL model 200 by adding redundant OP layers to produce an obfuscated DL model 201 on the right. A dashed-line, straight-corner block indicates a redundant OP layer and a dashed-line, round-corner block indicates a redundant operand.

The obfuscated DL model 201 includes three reshape layers (241, 242, and 243) after Conv2D 210. As shown in FIG. 2, the dimensions at the input of reshape layer 241 are the same as the dimensions at the output of reshape layer 243. Thus, reshape layers 241, 242, and 243 are redundant layers. The obfuscated DL model 201 also includes a slice layer 250 after Conv2D 210. However, the output of slice layer 250 is unused. Thus, slice layer 250 is redundant. The obfuscated DL model 201 further includes an add layer 260 to add zeros to the output of depthwise Conv2D 220. Adding zeros is a redundant operation; thus, add layer 260 is redundant.

Figure 3:
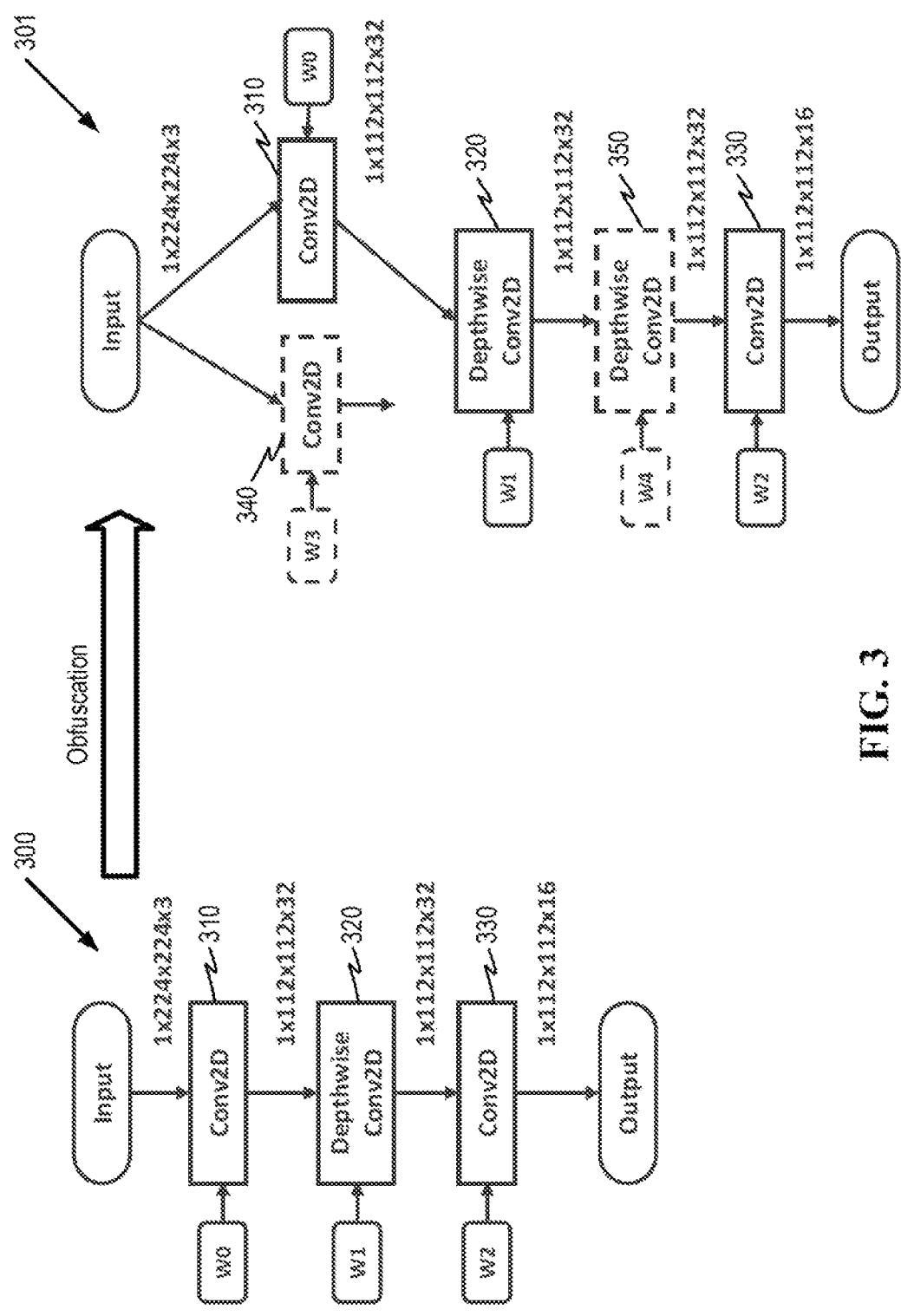
FIG. 3 illustrates an example of adding redundant OP layers and weights according to one embodiment.

FIG. 3 illustrates an example of adding redundant OP layers and weights according to one embodiment. A DL model 300 before obfuscation is shown on the left. The DL model 300 includes a first Conv2D 310, a depthwise Conv2D 320, and a second Conv2D 330, with weights W1, W2, and W3, respectively. In this example, the obfuscator 120 (FIG. 1) generates an obfuscated DL model 301 (shown on the right) from the DL model 300 by adding a redundant Conv2D 340 and a redundant depthwise Conv2D 350. The weight (W3) of Conv2D 340 can be any value because the output of Conv2D 340 is unused. The weight (W4) of depthwise Conv2D 350 has dimensions $1 \times 1 \times 1 \times 32$ (where 32 is the input channel size) and the weight values are all 1 s. With the weight values equal to all 1 s, depthwise Conv2D 350 is redundant because its output is equal to its input.

Figure 4:
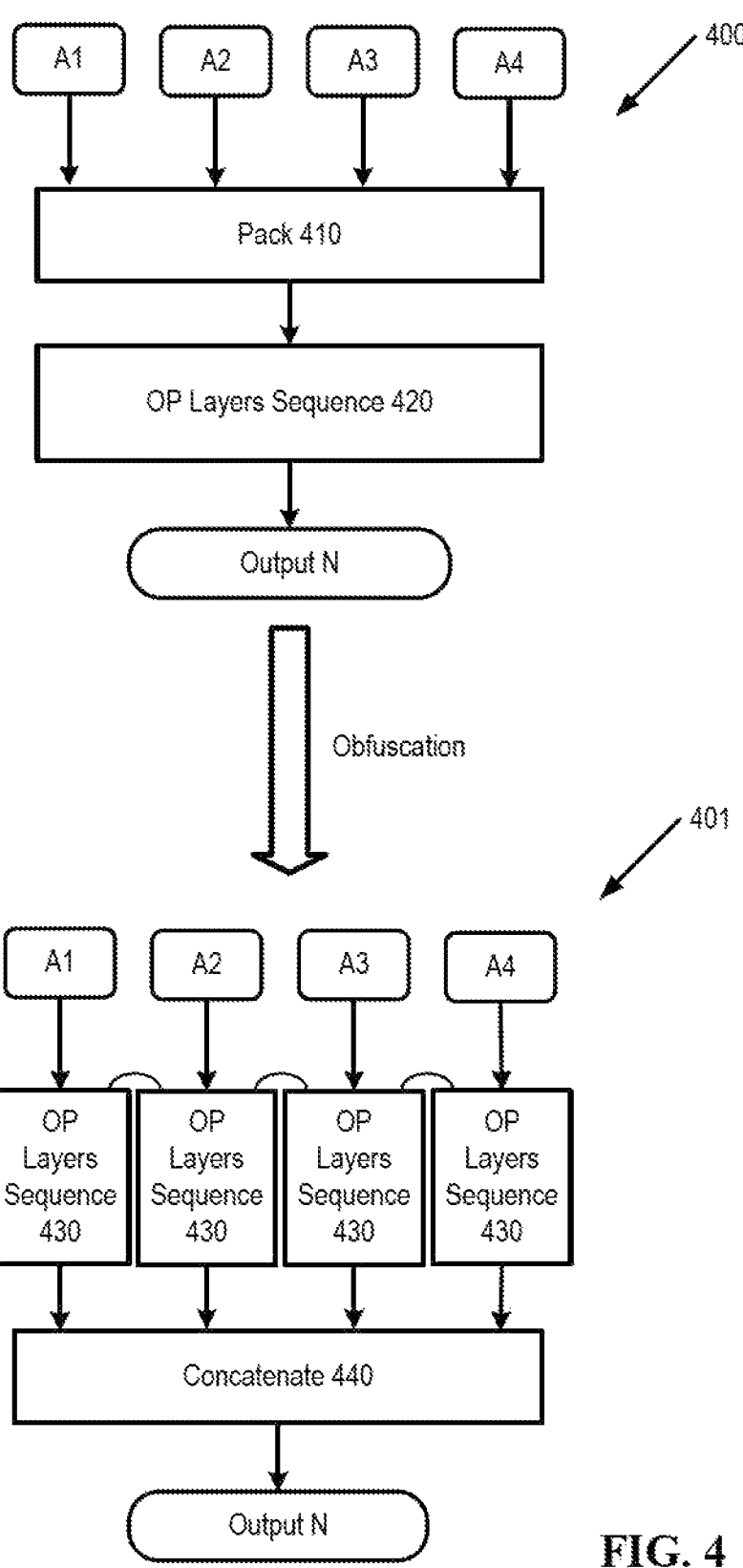
FIG. 4 illustrates an example of changing the execution order of a DL model according to one embodiment.

FIG. 4 illustrates an example of changing the execution order of a DL model according to one embodiment. A DL model 400 before obfuscation is shown at the top. In this example, the obfuscator 120 (FIG. 1) generates an obfuscated DL model 401 (shown at the bottom) from the DL model 400 by re-ordering OP layers without changing the input and output of the DL model 400. Thus, the obfuscation in this example changes the execution order of the DL model 400.

In this example, the DL model 400 receives four input operands A1, A2, A3, and A4; e.g., four floating-point numbers or another data format. Each input operand may be multi-dimensional; e.g., a 384×384 matrix. A pack layer 410 packs the four input operands into a four-element array (A1, A2, A3, A4), which is fed into an OP layers sequence 420 to produce an output N.

In the obfuscated DL model 401, each input operand is individually operated by an OP layers sequence 430 and the results from all four OP layers sequences 430 are concatenated together to produce the output N. Thus, the pack operation in the DL model 400 is changed to the concatenate operation at a different location in the DL model 401. As a result, the connection among the OP layers is changed by the obfuscation. With respect to the OP layers sequences 420 and 430, they may have the same operations but different dimensions. An example of the DL model 400 is shown in FIG. 5.

Figure 5:
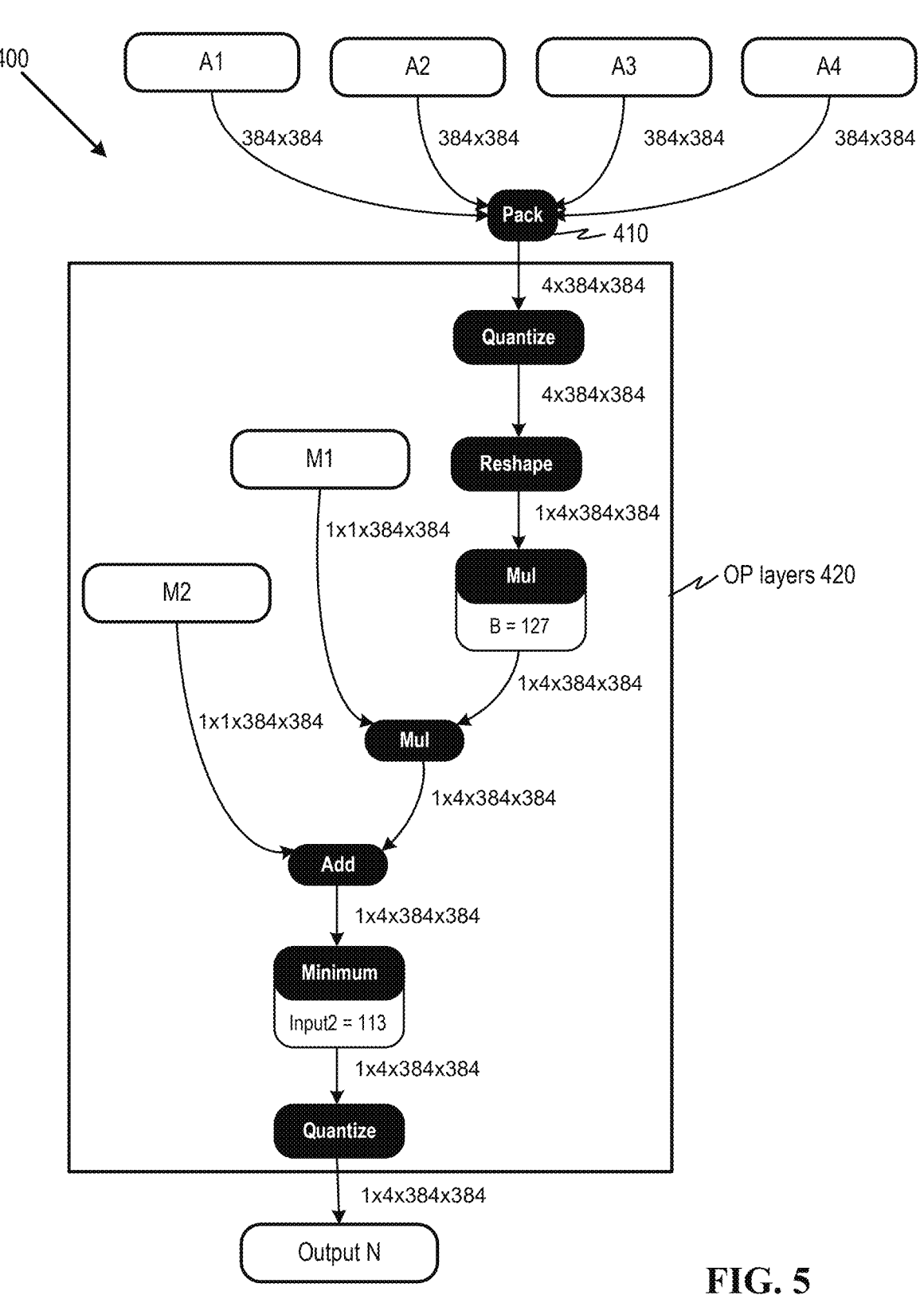
FIG. 5 illustrates an example of the DL model in FIG. 4.

FIG. 5 shows that the OP layers sequence 420 include a quantize layer, a reshape layer, two multiply layers, an add layer, a minimum layer, and another quantize layer. M1 and M2 represent operands of a multiply operation and an add operation, respectively. In one embodiment, the OP layers sequence 420 may be split into four smaller OP layers sequences such as OP layers sequences 430 in the obfuscated DL model 401. Each OP layers sequence 430 includes a corresponding one of the quantize layer, the reshape layer, the two multiply layers, the add layer, the minimum layer, and the other quantize layer, with each layer having a quarter of the original dimensions. Thus, an operand of 4×384×384 in the OP layers sequence 420 may be replaced by an operand of 384×384 in each OP layers sequence 430, and 1×4×384×384 in the OP layers sequence 420 may be replaced by an operand of 1×1×384×384 in each OP layers sequence 430.

The four OP layers sequences 430 may be interconnected with each other; e.g., they may share one or more operands of a multiply operation, an add operation, etc. In one embodiment, some or all of the OP layers sequences 430 may be further obfuscated in the same or different ways. As a result, the resulting four OP layers sequences may be different from one another.

As shown in the above examples, the obfuscator 120 (FIG. 1) may change the structure of a DL model, such as the number of OP layers, the connection among the OP layers, the operations performed by the OP layers, the order of the OP layers, etc. The obfuscator 120 may also change the parameters of the OP layers (e.g., by adding unused or redundant weights) and/or re-arrange the dimensions of the OP layers. In one embodiment, the obfuscator 120 can further add a watermark or a signature to the obfuscated DL model 115 to protect against piracy.

FIG. 6 is a flow diagram illustrating a method 600 for performing DL model obfuscation according to one embodiment. Method 600 may be performed by a system such as system 100 in FIG. 1. It is understood that the embodiment of FIG. 1 is for illustrative purposes only; other devices or systems with neural computing capabilities may perform method 600.

Method 600 begins at step 610 when a system trains a DL model to obtain weights of the OP layers in the DL model. The DL model includes an interface to a public API that provides access to a compiler of an AI processor. The system at step 620 obfuscates the DL model by changing the structure of the OP layers in the trained DL model to produce an obfuscated DL model. The system at step 630 publishes (e.g., makes it available for online access) the obfuscated DL model for access by devices. The obfuscated DL model is executable by the AI processor after compilation by the compiler on an edge device.

In one embodiment, the system may obfuscate the DL model by one or more of the following: re-ordering an execution sequence of the OP layers, adding redundant OP layers to the DL model, adding redundant weights to the OP layers in the DL model, changing connections among the OP layers in the DL model, changing one or more operations in the OP layers in the DL model, and/or reshaping dimensions of the OP layers in the DL model. The system may change the structure of the DL model without re-training the DL model. In one embodiment, the DL model and the obfuscated DL model are in the same model language. In one embodiment, the DL model and the obfuscated DL model produce inference results with substantially the same accuracy.

Figure 7:
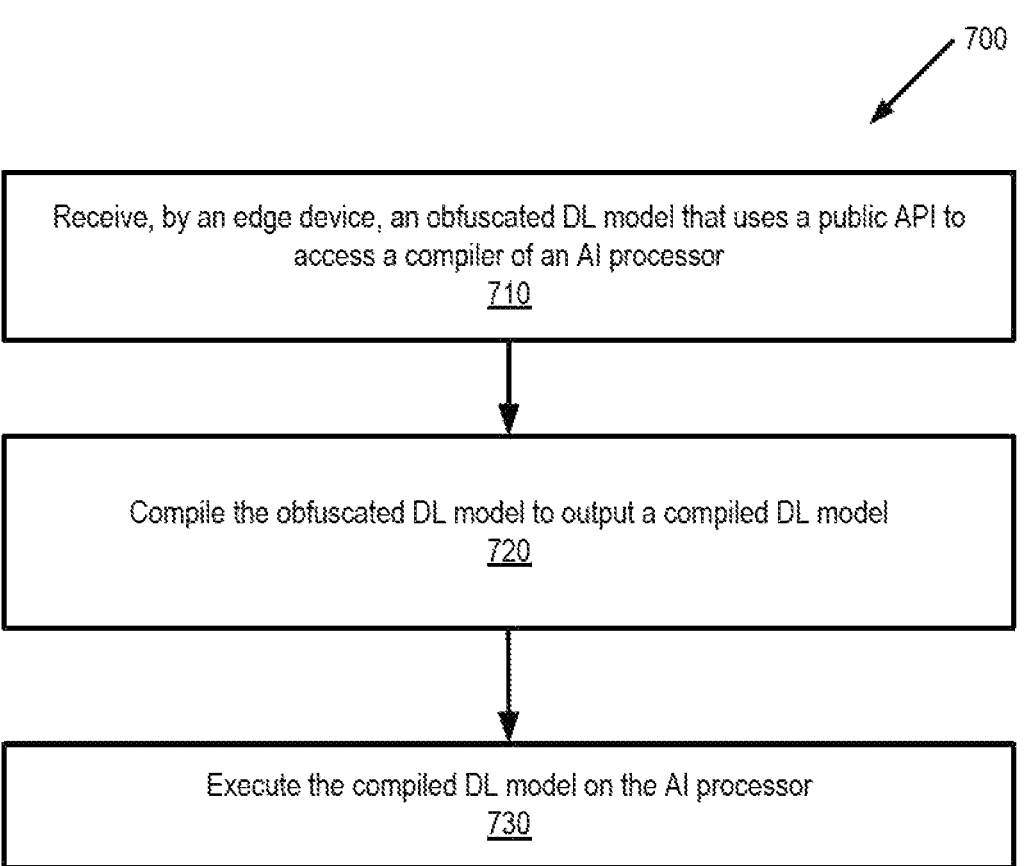
FIG. 7 is a flow diagram illustrating a method for executing an obfuscated DL model according to one embodiment.

FIG. 7 is a flow diagram illustrating a method 700 for executing an obfuscated DL model according to one embodiment. Method 700 may be performed by an edge device such as device 170 in FIG. 1. It is understood that the embodiment of FIG. 1 is for illustrative purposes only; other devices or systems with neural computing capabilities may perform method 700.

Method 700 begins at step 710 when a device receives an obfuscated DL model that uses a public API to access a compiler of an AI processor. The device at step 720 compiles the obfuscated DL model to output a compiled DL model. The device at step 730 executes the compiled DL model on the AI processor. In one embodiment, the compiler optimizes the obfuscated DL model by restoring at least a portion of a structure and/or weights of the original DL model. In another embodiment, the optimization of the compiled DL model may be performed at runtime.

Figure 8:
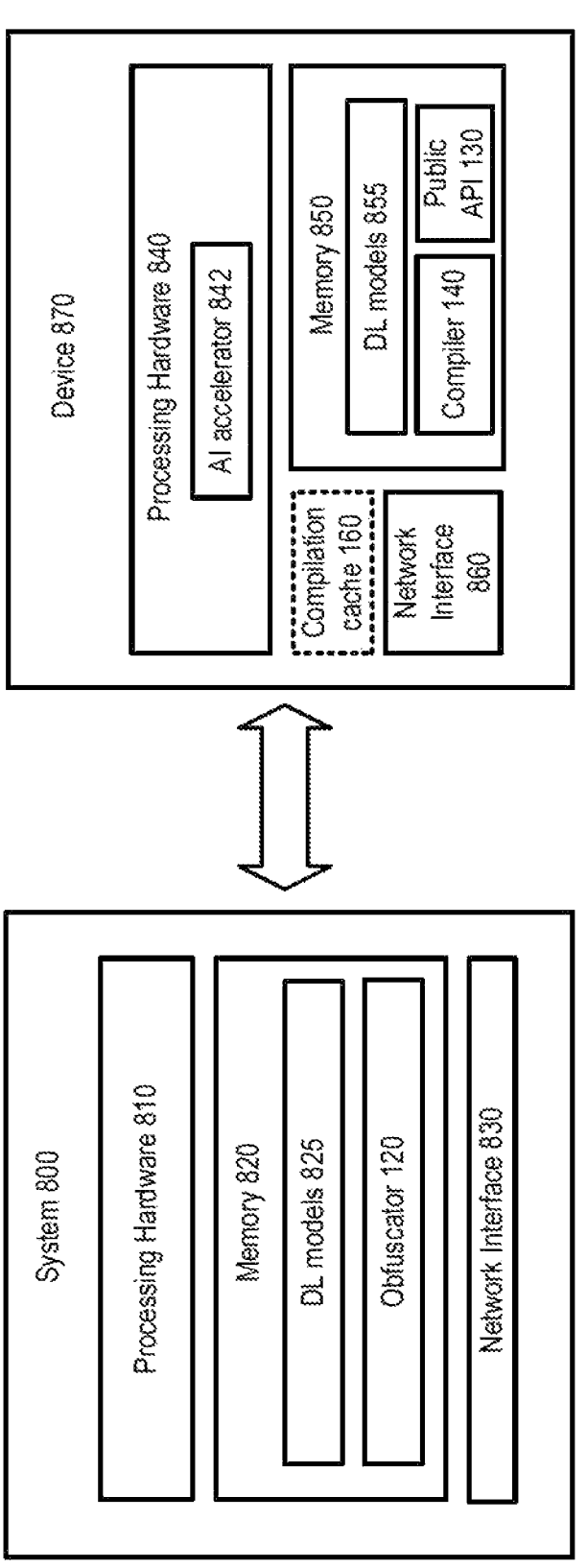
FIG. 8 is a block diagram illustrating a system performing DL model obfuscation and a device executing the obfuscated DL model according to one embodiment.

FIG. 8 is a block diagram illustrating a system 800 performing DL model obfuscation and a device 870 executing the obfuscated DL model according to one embodiment. System 800 and device 870 may be an example of system 100 and device 170 in FIG. 1, respectively. System 800 may be a computer system capable of performing neural computing. Device 870 may be an edge device, such as a smartphone, a computing device, a network-connected device, a gaming device, an entertainment device, an Internet-of-things (IoT) device, or any device capable of performing neural computing.

System 800 includes processing hardware 810, a memory 820, and a network interface 830. Device 870 includes processing hardware 840, a memory 850, and a network interface 860. In one embodiment, processing hardware 810 and/or 840 may include one or more processors such as: a central processing unit (CPU), a GPU, a digital processing unit (DSP), an AI processor, a multimedia processor, other general-purpose and/or special-purpose processing circuitry. In one embodiment, processing hardware 840 may include an AI processor 842, which is an example of the AI accelerator 150 in FIG. 1.

In one embodiment, memory 820 and/or 850 may include memory devices such as dynamic random access memory (DRAM), SRAM, flash memory, other non-transitory machine-readable storage media; e.g., volatile or non-volatile memory devices. Memory 820 and/or 850 may further include storage devices, for example, any type of solid-state or magnetic storage device. In some embodiments, memory 820 and/or 850 may store instructions which, when executed by the respective processing hardware, cause the respective processing hardware to perform the aforementioned method 600 (FIG. 6) and/or method 700 (FIG. 7). In one embodiment, memory 820 of the system 800 may store the obfuscator 120 (FIG. 1) and DL models 825. The obfuscator 120 may obfuscate a DL model to generate an obfuscated DL model. In one embodiment, memory 850 of device 870 may store the public API 130 and the compiler 140 (FIG. 1), as well as DL models such as the obfuscated DL model received from system 800. In one embodiment, device 870 may include the compilation cache 160 (FIG. 1) to store the compiled DL model generated by the compiler 140.

In some embodiments, system 800 and device 870 may also include network interfaces 830 and 860, respectively to connect to a wired and/or wireless network (e.g., the Internet) for transmitting and/or receiving an obfuscated DL model. It is understood the embodiment of FIG. 8 is simplified for illustration purposes. Additional hardware components may be included.

The operations of the flow diagrams of FIG. 6 and FIG. 7 have been described with reference to the exemplary embodiments of FIG. 1 and FIG. 8. However, it should be understood that the operations of the flow diagrams of FIG. 6 and FIG. 7 can be performed by embodiments of the invention other than the embodiments of FIG. 1 and FIG. 8, and the embodiments of FIG. 1 and FIG. 8 can perform operations different than those discussed with reference to the flow diagrams. While the flow diagrams of FIG. 6 and FIG. 7 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for obfuscating deep learning (DL) models, comprising:

training, by a computing system, a DL model to obtain weights of operation (OP) layers in the trained DL model;

obfuscating, by the computing system, the DL model by changing a structure of the OP layers to produce an obfuscated DL model, wherein a structural change includes, at least in part, a plurality of reshape layers added between adjacent ones of the OP layers with each reshape layer changing input dimensions to different output dimensions, and wherein the obfuscated DL model includes an interface to a public application programming interface (API) that provides access to a compiler of an artificial intelligence (AI) processor; and publishing the obfuscated DL model for download by an edge device over a public network, wherein the edge device includes the public API and the compiler to compile the obfuscated DL model for execution by the AI processor on the edge device.

2. The method of claim 1, wherein obfuscating the DL model further comprises:

re-ordering an execution sequence of the OP layers.

3. The method of claim 1, wherein obfuscating the DL model further comprises:

adding redundant OP layers to the DL model.

4. The method of claim 1, wherein obfuscating the DL model further comprises:

adding redundant weights to the OP layers in the DL model.

5. The method of claim 1, wherein obfuscating the DL model further comprises:

changing connections among the OP layers in the DL model.

6. The method of claim 1, wherein obfuscating the DL model further comprises:

changing one or more operations in the OP layers in the DL model.

7. The method of claim 1, wherein obfuscating the DL model further comprises:

changing the structure of the DL model without re-training the DL model.

8. The method of claim 1, wherein the DL model and the obfuscated DL model are in a same model language and produce inference results with substantially the same accuracy.

9. A system operative to obfuscate deep learning (DL) models, comprising:

an edge device, which includes an artificial intelligence (AI) processor and stores a compiler of the AI processor and a public application programming interface (API) that provides access to the compiler; and a computing system coupled to the edge device via a public network, the computing system including:

processing hardware; and memory to store an obfuscator and a DL model that includes a plurality of operation (OP) layers, wherein the processing hardware is operative to:

train the DL model to obtain weights of the OP layers, the DL model including an interface to the public API;

obfuscate the DL model using the obfuscator by changing a structure of the OP layers to produce an obfuscated DL model, wherein a structural change includes, at least in part, a plurality of reshape layers added between adjacent ones of the OP layers with each reshape layer changing input dimensions to different output dimensions; and publish the obfuscated DL model for access by devices, and wherein the edge device is further operative to:

download the obfuscated DL model over the public network; and compile the obfuscated DL model using the compiler through the public API to generate executable code for the AI processor.

10. The system of claim 9, wherein the processing hardware is further operative to:

obfuscate the DL model by re-ordering an execution sequence of the OP layers.

11. The system of claim 9, wherein the processing hardware is further operative to:

obfuscate the DL model by adding redundant OP layers to the DL model.

12. The system of claim 9, wherein the processing hardware is further operative to:

obfuscate the DL model by adding redundant weights to the OP layers in the DL model.

13. The system of claim 9, wherein the processing hardware is further operative to:

obfuscate the DL model by changing connections among the OP layers in the DL model.

14. The system of claim 9, wherein the processing hardware is further operative to:

obfuscate the DL model by changing one or more operations in the OP layers in the DL model.

15. The system of claim 9, wherein the processing hardware is further operative to:

change the structure of the DL model without re-training the DL model.

16. The system of claim 9, wherein the DL model and the obfuscated DL model are in a same model language and produce inference results with substantially the same accuracy.

17. A device, comprising:

processing hardware including an artificial intelligence (AI) processor;

memory to store a compiler of the AI processor and a public application programming interface (API) that provides access to the compiler; and a network interface to download an obfuscated DL model from a computer system over a public network, wherein the processing hardware is operative to:

compile the obfuscated DL model using the compiler through the public API to generate executable code, wherein the obfuscated DL model has been obfuscated from a trained DL model by a structural change in operation (OP) layers, the structural change including, at least in part, a plurality of reshape layers added between adjacent ones of the OP layers with each reshape layer changing input dimensions to different output dimensions; and execute the executable code by the AI processor.

18. The device of claim 17, further comprising:

a compilation cache to store the compiled obfuscated DL model generated by the compiler.

19. The device of claim 17, wherein the structural change including, at least in part, additions of redundant OP layers or redundant weights to the OP layers.

20. The device of claim 17, wherein the processing hardware is further operative to:

optimize compilation of the obfuscated DL model for execution on the AI processor based on proprietary information regarding obfuscation.

* * * * *